United States Patent [19]
Johnson

[11] 4,382,899
[45] May 10, 1983

[54] TEMPERATURE RESPONSIVE TIME DELAY VALVE

[75] Inventor: LeRoy B. Johnson, Perry, Mich.

[73] Assignee: Schmelzer Corporation, Flint, Mich.

[21] Appl. No.: 329,676

[22] Filed: Dec. 11, 1981

[51] Int. Cl.³ ............................................. F02M 1/02
[52] U.S. Cl. .................................. 261/39 B; 123/401
[58] Field of Search .............. 123/378, 401; 261/39 B

[56] References Cited
U.S. PATENT DOCUMENTS

| | | | |
|---|---|---|---|
| 3,486,742 | 12/1969 | Szwargulski | 261/39 B |
| 3,773,023 | 11/1973 | Taylor | 261/39 B |
| 3,886,240 | 5/1975 | Baldin et al. | 261/39 B |
| 4,178,895 | 12/1979 | Benjamin | 261/39 B |

Primary Examiner—William A. Cuchlinski, Jr.
Attorney, Agent, or Firm—Fisher, Gerhardt, Crampton & Groh

[57] ABSTRACT

A temperature responsive time delay valve in which free flow of fluid is afforded above a predetermined temperature level and in which a delayed fluid flow is achieved in one direction and free fluid flow in the opposite direction below the predetermined temperature level. The temperature responsive valve portion incorporates a bimetal disc which is supported at its outer periphery by O-rings to provide a resilient mounting and a fluid seal requiring passage of fluid through a central aperture in the disc.

12 Claims, 5 Drawing Figures

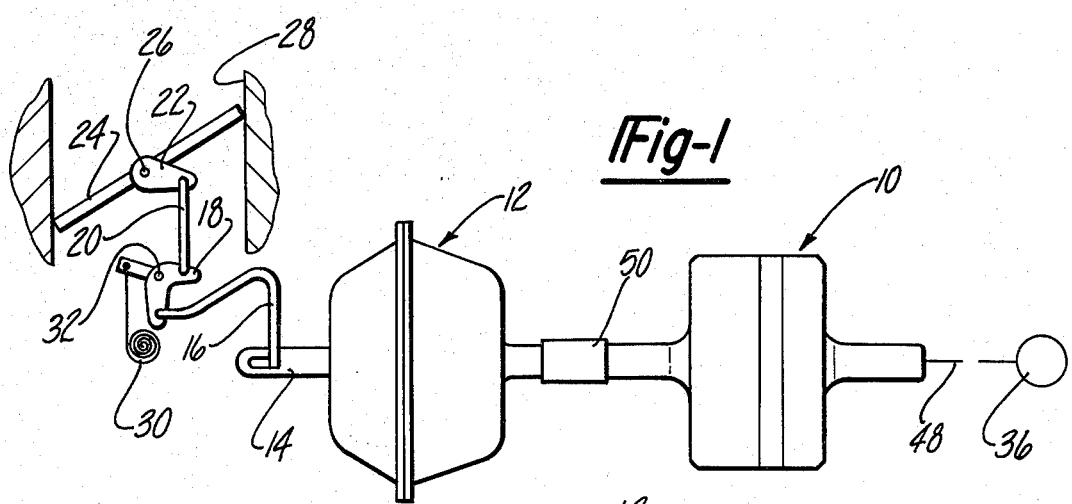
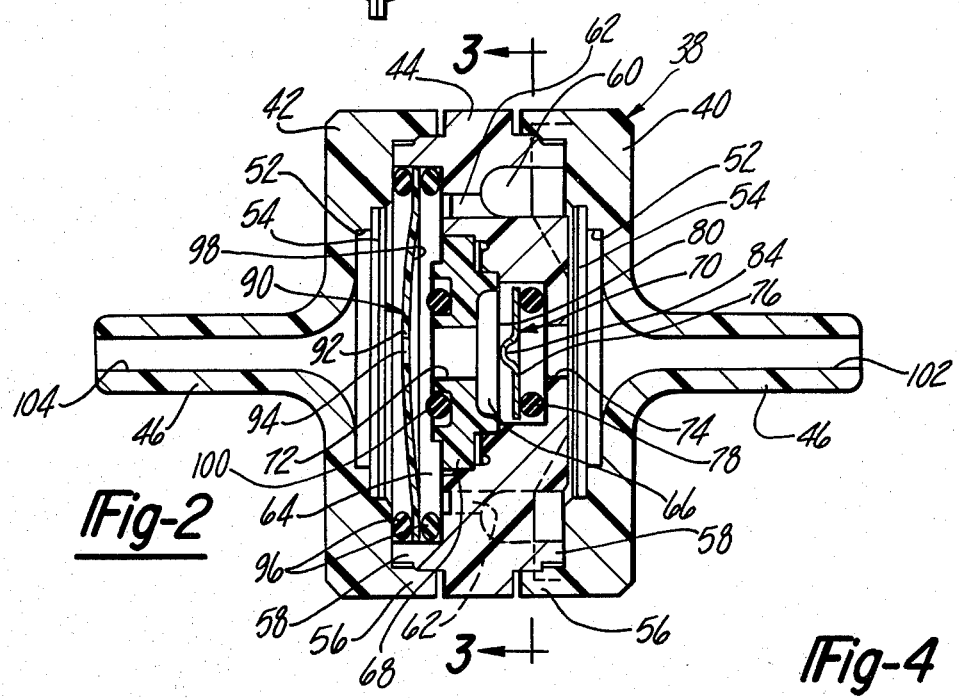
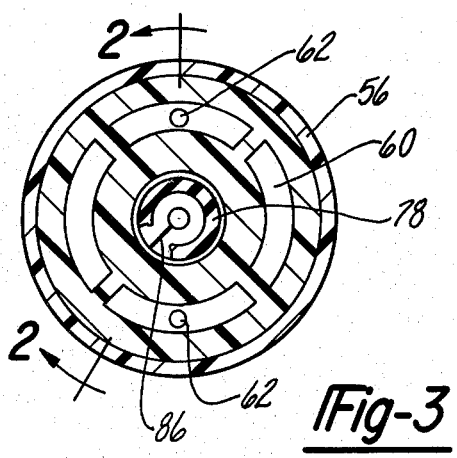
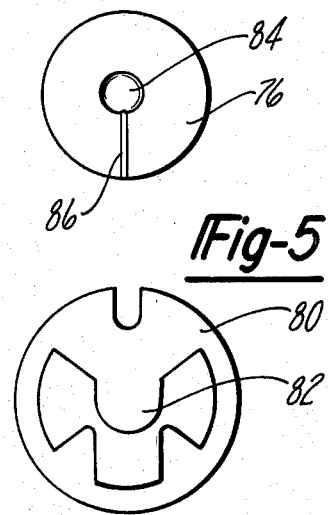
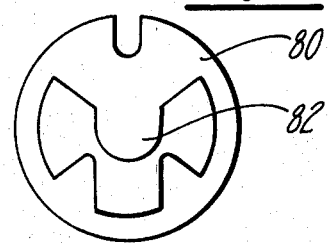

TEMPERATURE RESPONSIVE TIME DELAY VALVE

This invention relates to valves and more particularly to a temperature responsive time delay valve.

In certain fluid operated devices it is desirable to delay operation at a different rate at one temperature than at another. For example, with internal combustion engines used in automobiles, the induction system which includes a carburetor has an induction passage under the control of a choke valve. Such choke valves are commonly urged toward a closed position by an automatic temperature responsive choke control. However, after the engine is started, it often is desirable to move the choke valve to at least a partially open position faster than the temperature responsive choke valve is capable of accomplishing this. Vacuum break devices are used for this purpose and typically are a vacuum responsive motor which operates at a delayed rate from the time that the engine is started until the choke valve is open, usually for a period of a few seconds. Such operation is usually at its optimum at some predetermined average temperature. However, under cold conditions it often is desirable to delay the opening of the valve over a longer period of time than can be achieved with the usual vacuum break device.

It is a principle object of this invention to accomplish this end with a temperature responsive time delay valve which can be placed in series with a source of vacuum pressure and a device to be operated to accomplish actuation at some predetermined elevated temperature and delayed actuation at some temperature below the predetermined temperature.

It is another object of the invention to provide a temperature responsive time delay valve of this type which employs a bimetal disc resiliently supported at its outer circumference to provide a resilient mounting and a seal.

The objects of the invention are accomplished by a fluid control valve in which a time delay valve is disposed in a housing to permit free fluid flow in a first passage in one direction and requiring restricted flow in the opposite direction. The housing also is provided with a temperature responsive valve which under certain ambient temperature conditions with the temperature above a predetermined level permits the free flow of fluid in both directions through a second passage in the valve housing. When the temperature drops below a predetermined level, the temperature responsive valve assumes an operating condition closing the second passage and requires fluid flow through the first passage and the time delay valve. In this manner it is possible to provide for a delay in fluid flow in one direction below some predetermined level and yet permit free flow above the predetermined temperature level. The operating characteristics are achieved through a temperature responsive valve which is supported at its outer periphery by means of O-rings which offer a resilient suspension and at the same time provide a fluid seal preventing the passage of fluid to opposite sides of the bimetal valve element. The bimetal valve is provided with a central aperature through which all fluid flow must occur.

The presently preferred embodiment of the invention is illustrated in the accompanying drawings in which:

FIG. 1 is a diagrammatic view showing a fluid control valve embodying the invention used in combination with a fuel system for vehicles;

FIG. 2 is a cross-sectional view at an enlarged scale of the fluid control valve taken on line 2—2 in FIG. 3;

FIG. 3 is a cross-sectional view taken on line 3—3 in FIG. 2;

FIG. 4 is an enlarged scale of one of the valve elements of the device in FIG. 2; and FIG. 5 is a view of one of the elements of the valve device seen in FIG. 2.

A fluid control valve embodying the invention is designated generally at 10 in FIG. 1 and is shown in use with a fuel system of an internal combustion engine. More specifically, a vacuum break device 12 of a type frequently used with carburetors has a reciprocating output stem 14 connected through a link 16, bell crank 18 and link 20 to a choke control arm 22. The arm 22 is connected to a choke plate 24 by way of a shaft 26 about which the choke plate 24 can rotate. The choke plate 24 is mounted in an air induction passage 28 of a carburetor of an internal combustion engine. The choke plate 24 normally is urged toward the closed position illustrated in FIG. 1, particularly at low ambient temperatures by a bimetal choke control 30 connected to a shaft 32 on which the bell crank 18 is mounted and urges the bell crank 18 in a clockwise direction as viewed in FIG. 1. The vacuum break 12 acts through the output member 14 to assist the bimetal choke control 30 to hold the choke plate 24 in its closed position when the engine is not operating and acts to move the choke plate 24 to an open position against the action of the bimetal choke control 30 after the engine is started.

In typical installations, the vacuum break 12 is connected directly to a source of vacuum indicated at 36 which usually is the intake manifold of an internal combustion engine. In the present instance the fluid control valve 10 is installed in line or in series with the source 36 and the vacuum break device 12.

The fluid control valve 10 includes a housing 38 being made up of identical cover members 40 and 42 sandwiched in oppositely facing directions from an intermediate housing member 44. The cover members 40, 42 and housing member 44 are made of plastic material and are held together in fluid tight relationship by means of sonic welding or the like. The cover members 40 and 42 each include a tubular nipple portion 46 adapted to receive a hose 48 connected to the source 36 or a hose 50 connected to the vacuum break 12. The housing members 40 and 42 each have a stepped cavity 52 which receives an air filter element 54. The radial outer portion of each of the cover members 40 and 42 has an annular flange 56 which fits over and is fastened to complementary opposed annular flanges 58 forming part of the intermediate housing member 44.

The intermediate housing member 44 has an annular cavity 60 at one side of the intermediate member 44 which communicates by way of axially extending passages 62 with a chamber 64 formed between the cover member 42 and housing member 44. The intermediate housing member 44 has an axially disposed valve chamber 66 which receives a valve retainer element 68 also made of plastic and positioned to hold a time delay valve assembly designated at 70 in position within the housing. The valve chamber 66 is in communication with the chamber 64 by means of an axial passage 72 and communicates with the stepped cavity 52 of the cover member 40 by means of axial passage 74.

The time delay valve 70 within the chamber 66 includes a metallic disc 76 which normally is held in seated position with an O-ring 78 forming a valve seat by means of a spring element 80 seen also in FIG. 5. The spring element 80 has a finger element 82 which engages an axial protrusion 84 on the disc 76. The spring element 80 is made of a plastic resilient material such as mylar sheeting. The disc element 76 is provided with a coined radially extending groove 86 such that a restricted passage is formed when the disc element 76 is in seated position on the O-ring 78. When pressure forms to the right of the valve disc element 76, as viewed in FIG. 2, the disc element 76 is lifted off of its O-ring seat 78 against the action of spring element 80 to permit free passage of fluid from right to left. In the opposite direction the disc 76 is seated on seat 78 and fluid flow is restricted through the passage 86.

Disposed in the chamber 64 is a temperature responsive valve assembly designated at 90. The temperature responsive valve 90 includes a bimetal temperature responsive disc 92 which has an axial opening 94. The axially outer periphery of the disc 92 is engaged at opposite sides by a pair of identical O-rings 96. In the assembled condition the housing cover member 42 and intermediate housing member 44 press the O-rings 96 slightly against opposite sides of the disc 92 and serve to hold the latter in position within the housing 38 as well as to act as a seal requiring fluid flow through opening 94. The disc 92 is concavo-convex with its concave surface 98 facing an O-ring 100 forming a valve seat. At normal ambient temperatures, the concave surface 98 is spaced from the O-ring seat 100 as shown in FIG. 2. However, when the temperature drops below some predetermined minimum, the disc 92 flexes so that the surface 98 comes into engagement with the O-ring 100.

Flexture of the bimetal disc 92 between the position illustrated in FIG. 2 and its closed position serves to control fluid flow in the passages 62 communicating with the annular cavity 60.

The nipple 46 of the cover member 40 can be considered as forming an inlet passage 102 and the nipple 46 of the cover member 42 forms an outlet passage 104 which communicates by way of hose 50 to the vacuum break 12.

Under normal operating conditions with the ambient temperature above some predetermined level, the parts occupy the positions illustrated in the drawings in which the temperature responsive valve 90 is in its fully open position. Under such conditions, fluid is free to flow in both directions, that is from left to right or from right to left as viewed in FIG. 2. From left to right fluid can flow from outlet passage 104 through filter 54 axial opening 94 and through axially extending passages 62 to the annular chamber 60 and through the other filter 54 and inlet passage 102. Time delay valve 70 remains in its closed condition because of the differential pressure acting on it but the other passages permit substantially unrestricted flow. From right to left as viewed in FIG. 2, fluid flow is through the annular passage 66 passages 62 and the axial opening 94 in the bimetal disc 92 through the outlet passage 94. At the same time, if fluid flow is sufficient the disc element 76 can be lifted off of the O-ring 78 against the action of spring 80 to also permit relatively free fluid flow through the axial passage 72. As a result of the relatively free fluid flow in either direction, when the valve 10 is used in a system such as that illustrated in FIG. 1, the system operates in the usual fashion so that when an internal combustion engine having the source of vacuum 36 is started, vacuum is made available at the vacuum break 12. This pulls the output stem 14 to the right and moves the choke valve 24 to an open position against the action of resistance offered by the automatic choke device 30.

When the temperature drops below a predetermined minimum, the disc 92 will flex to bring the surface 98 into engagement with the O-ring seat 100. This serves to close the axial passages 62 to fluid flow. Under such circumstances with the temperature below the predetermined minimum and upon establishing vacuum at vacuum source 36, the vacuum created causes air flow from the vacuum break 12 toward the source 36. Since the passages 62 are closed, air must flow from the outlet passage 104 through the axial opening 94 through the axial passage 72 to the chamber 66. Because of the differential in pressure acting on the disc 76, the latter will be held in its seated position on the O-ring 78 and all air flow must occur through the notch or slot 86 formed in one face of the disc element 76. This causes a delay in fluid flow so that the operation of the vacuum break 12 is delayed. The size of the notch 86 determines the rate of flow and the degree of delay.

Under the same conditions, with the temperature below the predetermined minimum, when the source of vacuum 36 is terminated such as would occur by turning off an internal combustion engine, atmospheric pressure is established at the source 36 and vacuum pressure existing in the vacuum break 12 causes a differential in pressure resulting in opening of the time delay valve 70 by lifting of the disc element 76 from its O-ring seat 78. This permits free fluid flow through the axial passage 72 and the axial opening 94 in the bimetal element 92 of the temperature responsive valve.

In this manner when temperature is above the predetermined minimum the vacuum break 12 is free to operate conventionally. However, when the temperature drops below the predetermined level fluid flow in one direction is delayed so that a further delay is applied and the vacuum break 12 operates more slowly thereby resulting in a greater delay in the opening of the choke plate 24 which is a desirable result in cold weather operations.

It would be understood that the composition of the bimetal disc 92 can be varied to obtain a different performance characteristics or switch points, that is, the predetermined temperatures at which the disc 92 deflects in a closing direction or in an opening direction. In one specific embodiment of the invention in which the time delay valve 10 is used in conjunction with a vacuum break 12 the disc 92 moved in a closing direction at approximately twenty degress Fahrenheit with a decreasing temperature and in an opening direction at approximately forty four degrees Fahrenheit with an increasing temperature.

In summary, the performance characteristics of the temperature responsive time delay valve are such that there is free fluid flow from right to left as viewed in FIG. 2, for all temperatures. Also there is free fluid flow in both directions with temperatures above the predetermined temperatures. However, with temperatures below the switch point or predetermined level, fluid flow is restricted from left to right to cause delay in the operation of such mechanisms as the vacuum break 12.

A fluid control valve for vacuum operated devices has been provided in which a housing has an inlet adapted for connection to a source of vacuum and an outlet adapted for connection to a device to be operated. The housing contains a time delay valve and also a temperature responsive valve so arranged that above a predetermined temperature level free fluid flow is permitted in opposite directions through the housing but below a predetermined temperature the flow of fluid is delayed in one direction. This permits the installation of such a valve in series with devices to be operated to insure a delay in operation below a predetermined temperature.

The embodiments of the invention in which an exclusive property or privilege is claimed are defined as follows:

1. A fluid control valve assembly comprising: a housing having an inlet communicating with a source of vacuum and an outlet communicated with a device to be operated, first and second passage means communicating between said inlet and outlet, a time delay valve disposed in said first passage means and having an open position permitting free flow of fluid from said source to said device and a closed position delaying flow from said device to said source, said second passage means bypassing said time delay valve, a temperature responsive valve in said housing having an opened position at a temperature above a predetermined minimum permitting fluid flow through said second passage means around said time delay valve and a closed position at a temperature below said predetermined minimum closing said second passage means and requiring fluid flow through said first passage means and said time delay valve.

2. The fluid control valve of claim 1 wherein said temperature responsive valve includes a bimetal disc supported relative to said housing by resilient means at the periphery of said bimetal disc.

3. The fluid control valve of claim 2 wherein said resilient means is formed by a pair of O-rings disposed at opposite sides of said bimetal disc.

4. The fluid control valve of claim 2 wherein said bimetal disc is concavo-convex with its concave surface at a temperature above said predetermined minimum facing a valve seat engageable by said bimetal disc.

5. The fluid control valve of claim 4 wherein said valve seat is formed by an O-ring surrounding said first passage means.

6. The fluid control valve of claim 1 wherein said time delay valve includes an O-ring forming a valve seat, a disc resiliently urged into engagement with said O-ring and a restricted passage between said disc and said O-ring limiting fluid flow from said inlet to said outlet when said disc is seated on said O-ring.

7. A fluid control valve of claim 1 wherein said housing includes first and second housing members forming a circular cavity, said temperature responsive valve including a bimetal disc disposed in said cavity, a pair of O-rings disposed at opposite sides of said bimetal disc and in engagement therewith and with said first and second housing members to resiliently suspend said disc for movement of a central portion of said disc into and out of engagement with a valve seat.

8. A fluid control valve for a vacuum operated device comprising: a housing having an inlet communicating with a source of vacuum and an outlet communicated with a device to be operated, first and second passage means communicating between said inlet and outlet, a time delay valve disposed in said first passage means and permitting free flow of fluid from said source to said device and delaying flow from said device to said source, a temperature responsive valve in said housing having an opened position at a temperature above a predetermined minimum permitting fluid flow through said first and second passage means and a closed position at a temperature below said predetermined minimum closing said second passage means and requiring fluid flow through said first passage means, said housing including first and second housing members forming a circular cavity, said temperature responsive valve including a bimetal disc disposed in said cavity, a pair of O-rings disposed at opposite sides of said bimetal disc and in engagement therewith and with said first and second housing members to resiliently suspend said disc for movement of a central portion of said disc into and out of engagement with a valve seat, said valve seat being formed by an O-ring disposed concentrically with said pair of O-rings.

9. The fluid control valve of claim 8 wherein said time delay valve has a valve seat formed by an additional O-ring concentric with said other O-rings.

10. The fluid control valve of claim 8 wherein a filter is associated with each of said first and second passage means.

11. The fuel system of claim 8 wherein said temperature responsive valve includes a bimetal disc and wherein said time delay valve includes a disc-shaped valve closure element arranged concentrically with each other.

12. A fuel system for an internal combustion engine including an induction passage, a choke valve in the passage, a vacuum responsive device operatively connected to the choke valve and adapted to move the choke valve from a closed position to a variable partially open position at a controlled rate in response to vacuum in the engine intake manifold after the engine begins operation, a temperature responsive time delay valve assembly having a housing, first and second passages communicating with said vacuum responsive device and said source of vacuum, a time delay valve disposed in said first passage permitting free fluid flow in one direction from said manifold to said vacuum responsive device and restricted flow in the other direction, a temperature responsive valve in said housing between said time delay valve and said vacuum responsive device having an open position permitting free fluid flow through said second passage and between said vacuum responsive device and said source at an elevated temperature and a closed position directing flow through said time delay device in said other direction below said predetermined elevated temperature whereby said controlled rate of movement of said choke valve is delayed below said predetermined temperature.

* * * * *